ically 2600° to 3000° F. I have dis-

UNITED STATES PATENT OFFICE.

HARRY P. BASSETT, OF CYNTHIANA, KENTUCKY.

BASIC REFRACTORY MATERIAL.

1,390,328.

Specification of Letters Patent.   Patented Sept. 13, 1921.

No Drawing.   Application filed October 15, 1919.   Serial No. 330,906.

*To all whom it may concern:*

Be it known that I, HARRY P. BASSETT, a citizen of the United States, residing at Cynthiana, in the county of Harrison and State of Kentucky, have invented certain new and useful Improvements in Basic Refractory Materials, of which the following is a specification.

This invention relates to basic refractory materials adapted for use as a lining for furnaces and the like, in which basic slag is used or formed, and has particular reference to a composition of this character produced from magnesian limestone containing iron, either in a metallic state or in the form of a compound and silica or other compound of silicon, and subjected to a sufficiently high temperature so that the magnesian lime will no longer slake with water, such material being known as "double burned" dolomite.

In producing double burned dolomite, it is the usual practice to heat the magnesian limestone, iron and silica or other compound of silicon, to a temperature of approximately from 2600° to 3000° F. I have discovered that double burned dolomite suitable for use in my composition can be obtained more readily and at a materially lower temperature if there be first added thereto from about 2 to 10 per cent. by weight of sodium chlorid or other alkali metal compound.

My improved basic refractory composition is adapted for use either compressed in the form of bricks or as a dry or a wet cement.

In the production of my new composition, I add to double burned dolomite, a compound of iron, preferably iron oxid, such as ground hematite; an alkali metal compound such as sodium oxid or sodium silicate, ground glass, or a compound of sodium with an acid constituent, such as sodium borate and silica or other compound of silicon, such as Portland cement, clay, potters' clay, or feldspar.

The particular iron compound or the particular alkali metal compound or the particular silicon compound to be added to the double burned dolomite is a matter of selection, those most readily and advantageously available at any given point being employed. However, I have found that there is an advantage in the use of some particular compounds of the character referred to where the finished material is to be formed into bricks or where it is to be used in the form of a dry or a wet cement. For example, where the compound is to be formed into bricks, I prefer to employ borax, sodium silicate and Portland cement. Where a dry cement is to be made, I prefer to employ ground glass and Portland cement. Where a wet cement is to be made, I prefer to use sodium silicate and potters' clay.

The following example illustrates my preferred composition for use in making bricks: granulated double burned dolomite, 100 to 120 parts by weight; iron oxid, 3 parts by weight; borax, 1 part by weight; sodium silicate, 2.5 parts by weight; Portland cement, 5 parts by weight.

The following example illustrates my preferred composition for use in producing a dry cement: powdered double burned dolomite, 90 to 110 parts by weight; iron oxid, 3 parts by weight; ground glass, 2 parts by weight; Portland cement, 5 parts by weight.

The following example illustrates my preferred composition for use in making a wet cement: powdered double burned dolomite, 90 to 110 parts by weight; iron oxid, 3 parts by weight; sodium silicate, 4 parts by weight; potters' clay, 5 parts by weight.

In producing my composition in the form of bricks, I have found it advantageous to mix therewith before forming and burning, from 25 to 35 per cent. by weight of crushed brick, previously made from the same composition. The bricks are formed and burned in the usual way in which fire brick are ordinarily produced, the temperature at which they are burned being preferably from about 2000° to 3000° F.

The mixture of materials, without burning or other treatment, is adapted to be employed as a dry cement in lining furnaces, converters, and the like, or in repairing, or replacing parts of, basic furnace linings such as magnesia brick linings. If my improved composition is to be employed as a wet cement, sufficient water is added to produce a plastic composition.

An important advantage of my composition, particularly where it is to be formed into brick, is that materials are employed which serve successively as binding agents at different temperatures to which the material is heated. For example, the Portland cement or potters' clay serves as a binding agent at any temperature from ordinary atmospheric temperatures to a red heat and under ordinary conditions to which materials of this character are subjected, to a temperature of about 1400° F. or somewhat above. The silica or other silicon compound in the composition in the mixture produces at a red heat, a silicious binding agent which is adapted to hold the material together until a temperature of about 1800° F. is reached. At, or somewhat below this temperature, the iron present combines with the silica or other silicon compound present in the mixture forming a dense, hard mass which serves as the final binder up to 3000° F. and above, in fact to the highest temperature to which furnace linings are subjected, the compound becoming progressively harder as the heat to which the material is subjected is raised above about 1800° F.

An important and recognized disadvantage of certain compositions now used in making refractory brick for furnace linings is that at certain temperatures to which the brick must be heated there is no binding agent therein effective at such temperatures to hold the composition in the form in which it is shaped or molded, and as a consequence, the bricks become warped or distorted so that the finished bricks are out of shape to such an extent as to interfere very materially with their use, and ordinarily a considerable proportion of the bricks are unusable for this reason. My composition is free from this disadvantage, the brick produced therefrom holding their shape throughout the burning process and in use.

In my composition, I am able to employ a smaller proportion of lime than heretofore has been successfully used in compositions of the same general character and as a result I am able to produce a brick capable of withstanding without melting or deterioration, a higher temperature than that to which such compositions could be heated without injury thereto.

In preparing my improved composition, I have found that in place of iron or an iron compound, I may employ any metal of the iron or aluminum groups, notably aluminum, titanium, chromium, zirconium or tungsten, or any compound of a metal belonging to either of these groups and such metals are, therefore, to be understood to be equivalents of iron for use in such composition.

While I have described in detail the preferred form of my composition, the preferred proportions of ingredients, and the preferred method of producing the same, it is to be understood that my invention is not strictly limited thereto, except as set forth in the subjoined claims.

Having thus described my invention, I claim:

1. The herein described basic refractory material comprising double burned dolomite, and a plurality of binding agents effective throughout different ranges of temperature from ordinary atmospheric temperatures to 3000° F.

2. The herein described basic refractory material comprising double burned dolomite, a binding agent effective at temperatures from ordinary atmospheric temperatures to a red heat, a binding agent effective at temperatures from a red heat to 1800° F., and a binding agent effective at temperatures from 1800° F. to 3000° F. and above.

3. The herein described basic refractory material comprising double burned dolomite, an oxid of a metal of the iron group, an alkali metal compound, and a silicon compound.

4. The herein described basic refractory material comprising double burned dolomite, iron oxid, an alkali metal compound, and a silicon compound.

5. The herein described basic refractory material comprising double burned dolomite, iron oxid, an alkali metal salt of silicon, and a compound of silicon.

6. The herein described basic refractory material comprising double burned dolomite, iron in the form of iron oxid, sodium silicate, and Portland cement.

7. The herein described basic refractory material comprising 100 to 120 parts by weight of double burned dolomite, about 3 parts by weight of iron oxid, about 2.5 parts by weight of sodium silicate, and about 5 parts by weight of Portland cement.

8. The herein described basic refractory material comprising 100 to 120 parts by weight of double burned dolomite, about 3 parts by weight of iron oxid, about 2.5 parts by weight of sodium silicate, about 1 part by weight of borax, and about 5 parts by weight of Portland cement.

9. The herein described basic refractory brick comprising double burned dolomite, a plurality of binding agents effective throughout different ranges of temperature from ordinary atmospheric temperatures to 3000° F. and approximately from 25 to 35 per cent. by weight of crushed brick made from the same composition.

10. The herein described basic refractory brick comprising double burned dolomite, iron oxid, an alkali metal compound, a silicon compound, and approximately from 25 to 35 per cent. by weight of crushed brick made from the same composition.

In testimony whereof I affix my signature in presence of two witnesses.

HARRY P. BASSETT.

Witnesses:
  MARY F. LYONS,
  CURTIS C. MEIGS.